United States Patent [19]
Filgas et al.

[11] Patent Number: 5,291,570
[45] Date of Patent: Mar. 1, 1994

[54] HIGH POWER LASER - OPTICAL FIBER CONNECTION SYSTEM

[75] Inventors: David M. Filgas, Walnut Creek; Gordon M. McFadden, Danville; Jeffery Broome, Livermore, all of Calif.; James F. York, Tempe; R. Scott Wofford, Glendale, both of Ariz.

[73] Assignee: Hobart Laser Products, Inc., Livermore, Calif.

[21] Appl. No.: 942,638

[22] Filed: Sep. 9, 1992

[51] Int. Cl.⁵ .............................................. G02B 6/36
[52] U.S. Cl. ........................................ 385/78; 385/84
[58] Field of Search ................. 385/55, 15, 56, 70, 385/78, 79, 80, 84, 88, 90, 91

[56] References Cited

U.S. PATENT DOCUMENTS

| | | | |
|---|---|---|---|
| 4,199,222 | 4/1980 | Ikushima et al. | 385/88 |
| 4,302,070 | 11/1981 | Nakayama et al. | 385/88 |
| 4,496,211 | 1/1985 | Daniel | 350/96 |
| 4,521,070 | 6/1985 | Sottini et al. | 350/96 |
| 4,673,795 | 6/1987 | Ortiz, Jr. | 219/121 |
| 4,676,586 | 6/1987 | Jones et al. | 350/96 |
| 4,707,073 | 11/1987 | Kocher | 350/96 |
| 4,729,621 | 3/1988 | Edelman | 350/96 |
| 4,737,004 | 4/1988 | Amitay et al. | 350/96 |
| 4,762,385 | 8/1988 | Fuse | 350/96 |
| 4,805,976 | 2/1989 | Wilkening et al. | 385/84 |
| 4,807,954 | 2/1989 | Oyamada et al. | 350/96 |
| 4,944,567 | 7/1990 | Kuper et al. | 350/96 |
| 4,945,489 | 7/1990 | Vahab | 364/505 |
| 5,048,919 | 9/1991 | Ladany | 385/49 |

OTHER PUBLICATIONS

American Machinist, ed. J. Jablonowski, "Between the Lines, You've Come A Long Way, Laser" (Mar. 1992), pp. 6, 37-48.

H. Miura et al., "Welding Characteristics with a 1.2kW CW YAG Laser Light . . . " Transactions of the Japan Welding Society, vol. 21 #2 (Oct. 1990), pp. 31-36.

N. Nakajima et al., "Fundamental Study of Welding with a 1kW YAG Laser Beam . . . " Welding International (1991), pp. 628-632.

T. Ishide et al., "Optical Fiber Transmission of 2kW CW YAG Laser . . . " SPIE vol. 1277 High-Power Solid State Lasers and Applications (1990), pp. 188-198.

J. Buchholz, "Characteristics of Flexible Fiber Cable . . . " SPIE vol. 1024 Beam Diagnostics and Beam Handling Systems (1988) pp. 65-70.

*Primary Examiner*—John Ngo
*Attorney, Agent, or Firm*—David H. Jaffer

[57] ABSTRACT

A system for coupling laser radiation at a high power to an optical fiber while dissipating heat from scattered laser and optical pump radiation, including an optical fiber, a protective ferrule surrounding a portion of the optical fiber extending from the input face of the optical fiber and welded to the fiber in the region of the input face and otherwise separated from the fiber by an air space, and a holder surrounding the ferrule to absorb scattered radiation and dissipate heat.

20 Claims, 1 Drawing Sheet

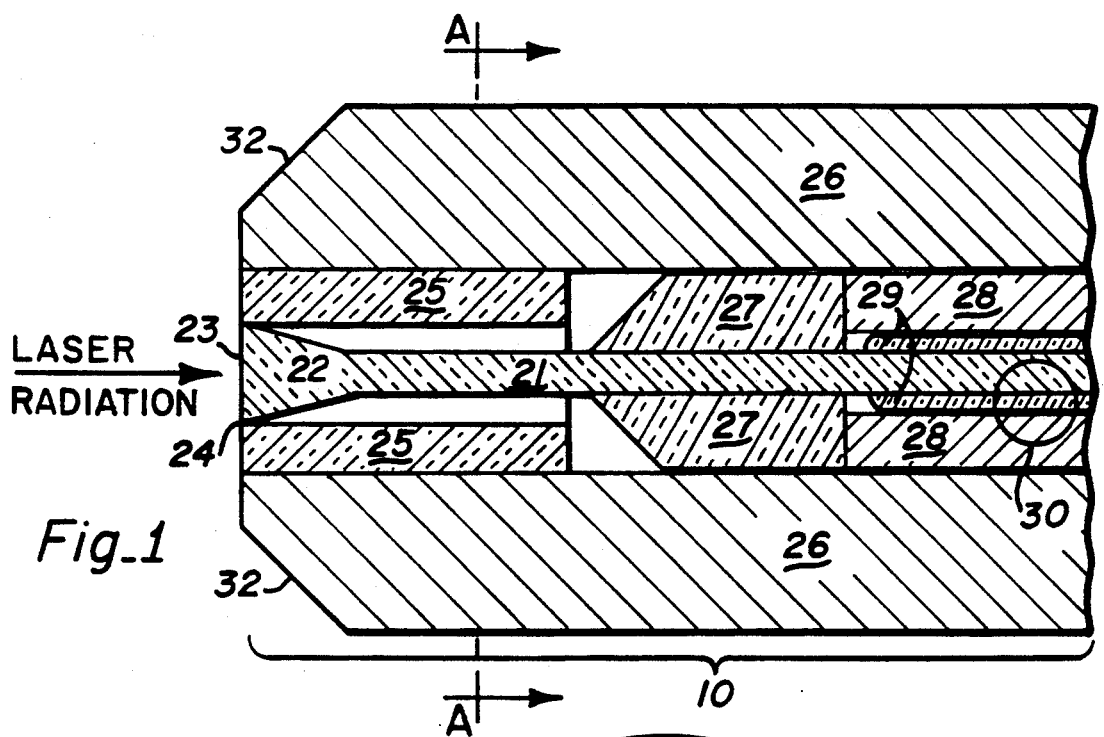
Fig_1
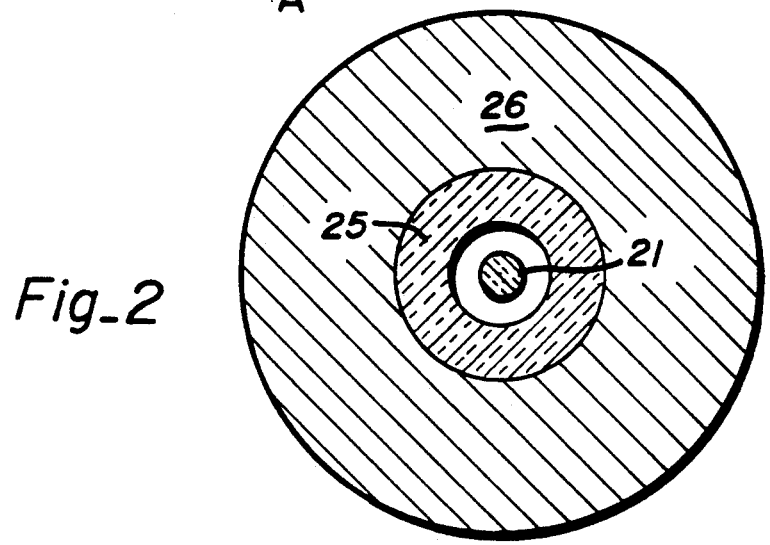
Fig_2
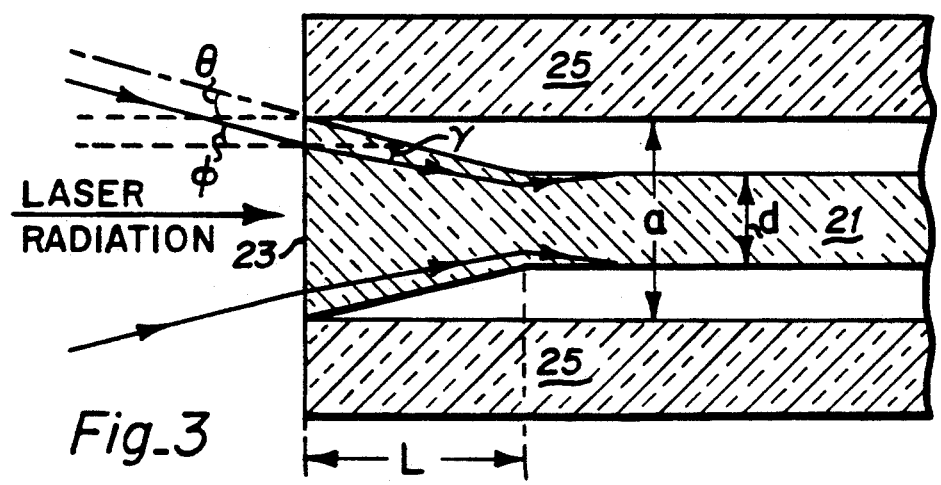
Fig_3

HIGH POWER LASER - OPTICAL FIBER CONNECTION SYSTEM

BACKGROUND OF THE INVENTION

1. Field of the Invention

This invention relates generally to a device for coupling a laser output to an optical fiber, and more particularly to a laser-optical fiber connector suitable for use with high power, continuous wave laser radiation.

2. Brief Description of the Prior Art

Fiberoptic connectors are well known in the art. A number of techniques are used for coupling the output of a laser into an optical fiber. Among the problems which must be addressed in the coupling of a laser output into an optical fiber is correct alignment of the laser to maximize the amount of laser light which enters the fiber and to minimize losses through reflections from the front face of the fiber or through light which is scattered out of the fiber. Excessive heat may be generated if scattered light impinges upon portions of the connector. These problems are exacerbated in high power lasers where heat gains from scattered light may cause damage or destruction to the optical fiber or connector. U.S. Pat. Nos. 4,762,385; 4,676,586; 4,521,070; and 4,944,567 provide examples of the types of connectors known in the prior art for coupling laser light to an optical fiber.

In addition, a variety of tapered optical fibers have been used to enhance delivery of radiation from a laser to an optical fiber. Examples of the use of such tapered optical fibers include U.S. Pat. Nos. 4,729,621; 4,737,004; and 4,807,954.

SUMMARY OF THE INVENTION

It is a primary object of the present invention to provide a device for optimizing delivery of high power, continuous wave laser radiation to an optical fiber. The invention permits delivery of such laser radiation to remote locations via a flexible optical cable, where the high power laser radiation facilitates materials processes that previously could not be performed with radiation delivered through an optical fiber. The design provides easier entry of the laser radiation while aiding in thermal transfer and strengthening the end of the optical fiber.

Another object of the present invention is to provide a support for the end of the optical fiber, providing mechanical support without pressure on the optical fiber that might cause light leakage and consequent thermal heating. This avoids pressure at a localized point on the optical fiber. Pressure at a localized point near the input end of the fiber can cause a change in the refractive index of the optical fiber and consequent light leakage and thermal heating problems.

It is still another object of the present invention to provide means for conducting light and any heat from scattered light away from the optical fiber, to prevent thermal heating of the optical fiber.

It is yet another object of the present invention to provide a dual waveguide fiber mechanism for minimizing any losses in the optical fiber.

Briefly, the preferred embodiment of the present invention comprises a flared optical fiber to provide easier entry of laser radiation. To aid in thermal transfer and to strengthen the end of the optical fiber, a silica support tube or ferrule surrounds the end of the optical fiber. The silica ferrule provides mechanical support without pressure on the optical fiber that might cause light leakage and consequent thermal heating. Light leakage passes through the silica ferrule and is absorbed when it impinges on an anodized aluminum tube outside the silica support tube. The aluminum tube is a good heat conductor and can be easily cooled to remove any excess heat arising from the leakage light. This laser-optical fiber connection system facilitates delivery of high power, continuous wave laser radiation to a remote location through the optical fiber, permitting sufficient laser power to be delivered to allow applications that previously could not be achieved when an optical fiber was used to direct the laser radiation.

IN THE DRAWINGS

FIG. 1 is a cross-sectional view of the preferred embodiment of the connection system of this invention, taken along the lengthwise axis of the device;

FIG. 2 is a cross-sectional view of the device shown in FIG. 1, taken along line A—A of FIG. 1; and FIG. 3 is an enlarged cross-sectional view of the optical fiber and silica ferrule at the input end of the optical fiber.

DETAILED DESCRIPTION OF THE PREFERRED EMBODIMENT

This invention provides a connector device that conveniently and dependably permits high power laser output to be connected to an optical fiber, while reducing thermal heating problems which might damage the fiber. Reduction in thermal heating permits higher power to be delivered through the optical fiber, thereby facilitating applications that previously could not be accomplished when an optical fiber was used to deliver laser radiation. The design strengthens the end of the optical fiber and also provides a dual waveguide fiber mechanism for minimizing losses from the fiber.

Referring now to FIG. 1 of the drawing, the end portion of optical fiber connector 10 is shown. Laser radiation enters the fiber at one end of the connector. The opposite end of the connector attaches to a flexible cable which surrounds and protects the optical fiber. The optical fiber and cable may be several hundred meters in length, allowing high power laser radiation to be delivered to a remote work place.

The outer portion of connector 10 is a holder 26. The end of holder 26, where the laser radiation is input into the optical fiber, is formed with bevels 32 such that connector 10 may be accurately placed into a mount, thereby permitting focusing of the laser radiation into the optical fiber.

Optical fiber 21 is located in the interior of connector 10. Optical fiber 21 extends from fiber input face 23, where laser radiation is input, to the end of the optical fiber where the laser radiation may be output and utilized for whatever application the laser light is being used. From fiber input face 23, which in the preferred embodiment is approximately 1.2 mm in diameter, a tapered region 22 of optical fiber 21 extends longitudinally for approximately 10 mm. Optical fiber 21 tapers from the 1.2 mm diameter at fiber input face 23 to approximately 0.6 mm beyond tapered region 22. Optical fiber 21 is preferably composed of ultrapure synthetic fused silica, which is transparent to light of 1064 nm, such as that output from a YAG laser. The fiber has an exterior cladding of fluorine-doped fused silica with a lower refractive index than the interior silica, causing internal reflection of light in the fiber.

Fiber input face 23 is preferably polished with a $CO_2$ laser rather than mechanically polished as is commonly done in the prior art. Mechanically polishing an optical fiber inevitably leaves some impurities on fiber input face 23, causing laser radiation to be scattered upon incidence on the face. This scattered light may either be reflected away from optical fiber 21, or may enter optical fiber 21 at an angle where it leaves the optical fiber. With a high power laser, such light scattered into the optical fiber (and subsequently leaking out of it) may cause thermal heating when the scattered light leaving the fiber is absorbed in the portions of the connector surrounding the optical fiber. Such thermal heating may damage or destroy the connector. Mechanical polishing can also induce subsurface damage sites which will couple highly to the laser energy and cause laser-induced damage to the fiber face. Laser polishing of fiber input face 23 yields a surface which is smoother and freer of impurities, thus providing advantages when high power laser light is input into optical fiber 21.

The end of optical fiber 21 is protected by a ferrule 25. Ferrule 25 is preferably composed of fused silica or fused quartz, and thus transparent to 1064 nm YAG radiation. Ferrule 25 forms a protective tube around optical fiber 21, and is laser welded to optical fiber 21 in the region where the laser radiation is input into optical fiber 21. Weld region 24 extends for approximately 0.5 mm. The weld region is formed between ferrule 25 and optical fiber 21 by placing ferrule 25 over fiber 21, and rotating the ferrule and fiber in front of a $CO_2$ laser focused to a small spot at the edge of the fiber face and moved along the circumference of the fiber face to weld it to the ferrule. The $CO_2$ laser is also used to cut the fiber and ferrule and to polish fiber input face 23.

Ferrule 25 preferably extends for a distance of approximately 35 mm from fiber input face 23 along optical fiber 21. Beyond weld region 24, optical fiber 21 and silica ferrule 25 are separated by an air space. This portion of optical fiber 21 is not jacketed by protective buffer.

After laser radiation enters optical fiber 21 at fiber input face 23, the portion of laser radiation which is scattered from fiber input face 23 or which enters at such an angle that it is not internally reflected within optical fiber 21, passes through the air space between optical fiber 21 through ferrule 25, and impinges upon holder 26. FIG. 2 illustrates the air spaces between optical fiber 21, ferrule 25, and holder 26.

Since ferrule 25 is transparent to the laser radiation, the radiation passes through ferrule 25 without generating local heating. The laser radiation is then absorbed in holder 26 which is constructed of a material that absorbs the radiation and is a good heat conductor. In the preferred embodiment, black anodized aluminum is used. Holder 26 thus provides a good heat conductor, and can be easily cooled to remove the excess heat arising from scattered light or light leaking from the optical fiber. Although liquid cooling may be used, we have found that simple conduction into the fiber mounting structure is satisfactory with a 2400 W CW YAG laser.

Beyond ferrule 25 is a reflector 27, preferably gold coated. Reflector 27 ensures that any laser radiation or stray flash lamp radiation from the laser pumping system that enters the connector and/or optical fiber off-axis is reflected into holder 26, where it is absorbed, causing some heating which is dissipated by the heat capacity of the connector.

Beyond reflector 27 is fiber attachment tube 28. Reflector 27 is attached to fiber attachment tube 28. In the region near the connection of fiber attachment tube 28 and reflector 27, optical fiber 21 is surrounded with optical fiber jacketing 29. Fiber jacketing 29 preferably is a buffer material such as silicone surrounded by an extruded coating, preferably of nylon or tefzel. Both the buffer material and coating are preferably transparent or translucent to the laser radiation. Fiber jacketing 29 provides a dual waveguide fiber mechanism that minimizes losses in the optical fiber. The refractive index of the silicone is lower than the fluorine-doped fused silica on the outside of the optical fiber core. As a consequence, light that exits the optical fiber through the fluorine-doped fused silica at the outer diameter of the optical fiber core may still be reflected back into the optical fiber core because of internal reflection at the fluorine-doped fused silica/silicone interface.

Fiber attachment tube 28 is approximately 100 mm long with an internal diameter slightly larger than fiber jacketing 29. Fiber attachment tube 28 is attached adhesively to fiber jacketing 29 in attachment region 30 along approximately 50% of the length of fiber attachment tube 28. Fiber attachment tube 28 provides a means for holding optical fiber 21 along a distributed length to minimize point stresses. Fiber attachment tube 28 is preferably composed of metal. The opposite end of fiber attachment tube 28 (not shown) is mechanically secured to holder 26 by a nut. Ferrule 25 is preferably secured in holder 26 by close tolerance. The inner diameter of holder 26 is machined for a snug slip fit around ferrule 25. Heating of holder 26 during assembly may be necessary to expand holder 26 for ease of assembly. The correct placement and retention of ferrule 25 is facilitated by the mechanical connection of fiber attachment tube 28 to holder 26.

Fiber attachment tube 28 and fiber jacketing 29 are preferably attached with a glue that is transparent to the laser radiation. In this embodiment, cyanoacrylate glue is used because it provides a strong bond and is transparent to YAG laser radiation. Attachment of tube 28 and jacketing 29 may cause a change in the refractive index of the optical fiber in the attachment region, resulting in some leakage of radiation from the fiber. As noted above, attachment over a longer region minimizes point stresses. In addition, because attachment area 30 is located a significant distance (preferably more than 100 mm) from fiber input face 23 where there is the most scattered light from the laser radiation input, the problem of local heating in the attachment area is significantly reduced. Thus, damage to the optical fiber connector is significantly reduced, and higher laser power may be placed into optical fiber 21.

FIG. 3 shows the tapered region of optical fiber 21 in more detail. For optimum coupling of laser radiation into optical fiber 21, the laser radiation (indicated by solid rays in FIG. 3) is focused into a spot size smaller than the diameter of the fiber core at the entrance face (a), and preferably converging to be similar in size to the diameter of the fiber core size (d) at the end of the tapered region of the core. For clarity in FIG. 3, the rays representing the laser radiation are shown to converge to a size somewhat smaller than fiber core size (d). The focused laser radiation will be converging with some angle $\phi$, which will become angle $\gamma$ after refraction at the fiber face $$\gamma = \frac{\phi}{\sin(n_{core})}$$

where $n_{core}$ is the refractive index of the fiber core. The waist of the laser radiation (i.e. its narrowest point) should preferably be positioned at the end of the fiber taper. Fiber taper angle $\theta$ should be slightly larger than the angle, $\gamma$, of the converging laser radiation in the optical fiber, and the taper length (L) should be chosen so that the beam spot size at the input face fills approximately 75% of the diameter (a) of the fiber input face. The taper ratio is defined as $$\frac{a}{d} = \frac{d + 2L(\tan\theta)}{d}.$$

The limit for coupling a beam of laser radiation efficiently into the fiber requires that the numerical aperture (NA) of the focused beam (defined as $NA = \sin(\theta)$) must be less than or equal to the NA of the fiber divided by the taper ratio:

$$NA_{beam} \leq \frac{NA_{fiber}}{\text{Taper ratio}} \quad \text{where}$$

$$NA_{fiber} = \sqrt{n_{core}^2 - n_{clad}^2}$$

and $n_{core}$ is the refractive index of the fiber core and $n_{clad}$ is the refractive index of fluorine-doped exterior of the fiber.

An example of the design procedure follows. Fiber core size and numerical aperture are selected. In the preferred embodiment, fiber core size is 0.6 mm and $NA_{fiber} = 0.19$. Beam focusing is optimized to give a spot size about equal to fiber core size. This determines focusing angle $\phi$. Taper dimensions are chosen so that $\theta > \gamma$, and so that the beam fills approximately 75% of the entrance face. Then verify that $$NA_{beam} \leq \frac{NA_{fiber}}{\text{Taper ratio}}.$$

This procedure will provide maximum coupling efficiency, a reduced power density at the input face compared with not using a taper, and maximum alignment insensitivity.

The connector and dual waveguide mechanism described above facilitate high power, continuous wave laser radiation to be transmitted in an optical fiber at much higher powers than previously possible. Continuous laser radiation of up to 2400 W has been transmitted over an optical fiber for hundreds of meters, with losses of only about 10%. Delivery of such power with a spot size ranging from several hundred microns to many millimeters generates very high energy densities. Since the optical fiber is flexible, the energy may be delivered to the work piece. In the past, it has been necessary to deliver the work piece to the laser radiation and delivery of the laser radiation has been limited by the inflexibility of systems using conventional optics. Among the applications facilitated by the higher powers delivered through this high power laser/optical fiber system are welding, cutting and cladding (or hard facing). Conventional cladding is discussed in U.S. Pat. No. 4,376,793. As noted above, these applications may now be performed at locations remote from the laser, and the use of a flexible optical fiber/cable allows the laser radiation to be delivered to the work piece, rather than vice versa.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An apparatus for coupling high power laser radiation into an optical fiber while dissipating heat from scattered laser and optical pump radiation comprising:
   (a) an optical fiber with a face for input of laser radiation;
   (b) a protective ferrule surrounding a lengthwise portion of said optical fiber extending from said input face, said ferrule substantially transparent to the scattered radiation, said ferrule welded to said fiber in the region of said input face and otherwise separated from said fiber, an air space formed between at least a portion of said ferrule and said fiber; and
   (c) a holder surrounding said ferrule, said holder comprised of a material which absorbs the scattered radiation passing through said ferrule and conducts away heat generated from said absorbed scattered radiation.

2. The apparatus of claim 1, wherein the ferrule is laser welded to the fiber and the input face is laser polished.

3. The apparatus of claim 1, further comprising a reflector within said holder, said reflector situated beyond the end of the ferrule to deflect scattered radiation passing through the ferrule into said holder.

4. The apparatus of claim 1, further comprising a fiber attachment tube secured to the holder, said fiber attachment tube surrounding a portion of the optical fiber beyond said ferrule, and wherein an adhesive attaches said fiber attachment tube to a fiber jacketing surrounding the portion of said optical fiber extending through said fiber attachment tube, thereby securing said optical fiber in said fiber attachment tube.

5. The apparatus of claim 4, further comprising a reflector within said holder, said reflector situated between the ferrule and the fiber attachment tube, thereby deflecting scattered radiation passing through the ferrule into said holder.

6. The apparatus of claim 4, wherein said fiber attachment tube is adhesively attached to the fiber jacketing of the optical fiber over at least 25% of the length of the fiber attachment tube.

7. The apparatus of claim 4, wherein the region in which the fiber attachment tube is adhesively attached to the fiber jacketing of the optical fiber is at least 50 mm from the input face of the optical fiber.

8. The apparatus of claim 1, wherein said fiber has a region decreasing from a greater cross-section at said input face to a smaller cross-section.

9. The apparatus of claim 8, wherein the ferrule extends beyond the decreasing cross-section region of the optical fiber.

10. The apparatus of claim 8, wherein the ferrule is laser welded to the fiber and the input face is laser polished.

11. The apparatus of claim 8 further comprising a reflector within said holder, said reflector situated beyond the end of the ferrule to deflect scattered radiation passing through the ferrule into said holder.

12. The apparatus of claim 8, further comprising a fiber attachment tube secured to the holder, said fiber attachment tube surrounding a portion of the optical fiber beyond said ferrule, and wherein an adhesive attaches said fiber attachment tube to a fiber jacketing surrounding the portion of said optical fiber extending through said fiber attachment tube, thereby securing said optical fiber in said fiber attachment tube.

13. The apparatus of claim 12, further comprising a reflector within said holder, said reflector situated between the ferrule and the fiber attachment tube, thereby deflecting scattered radiation passing through the ferrule into said holder.

14. The apparatus of claim 12, wherein said fiber attachment tube is adhesively attached to the fiber jacketing of the optical fiber over at least 25% of the length of the fiber attachment tube.

15. The apparatus of claim 12, wherein the region in which the fiber attachment tube is adhesively attached to the fiber jacketing of the optical fiber is at least 50 mm from the input face of the optical fiber.

16. A method for coupling high power laser radiation into an optical fiber while dissipating heat from scattered laser and optical pump radiation comprising the steps of:
 (a) focusing laser radiation into an input face of an optical fiber;
 (b) supporting a lengthwise portion of said optical fiber extending from said input face with a ferrule substantially transparent to scattered radiation, said ferrule welded to said fiber in the region of said input face and otherwise separated from said fiber, an air space formed between at least a portion of said ferrule and said fiber; and
 (c) providing a light-absorbent and heat-conductive holder fitted around said ferrule, said holder absorbing scattered radiation and conducting away heat generated from said absorbed scattered radiation.

17. The method of claim 16, further comprising the steps of:
 (a) securing the optical fiber in a fiber attachment tube which surrounds a portion of the optical fiber beyond the ferrule, by attaching a fiber jacketing surrounding the portion of the optical fiber extending through the fiber attachment tube to the fiber attachment tube with an adhesive; and
 (b) securing the fiber attachment tube to the holder.

18. The method of claim 17, further comprising the step of deflecting scattered radiation which passes through the ferrule into the holder by positioning a reflector within the holder between the ferrule and the fiber attachment tube.

19. The method of claim 17, wherein said fiber attachment tube is adhesively attached to the fiber jacketing of the optical fiber over at least 25% of the length of the fiber attachment tube.

20. The method of claim 17, wherein the region in which the fiber attachment tube is adhesively attached to the fiber jacketing of the optical fiber is at least 50 mm from the input face of the optical fiber.

* * * * *